(12) United States Patent
Kasriel et al.

(10) Patent No.: US 6,981,017 B1
(45) Date of Patent: Dec. 27, 2005

(54) PREDICTIVE PRE-DOWNLOAD USING NORMALIZED NETWORK OBJECT IDENTIFIERS

(75) Inventors: Stephane Kasriel, Neuilly (FR); Xavier Casanova, Saint Germain en Laye (FR); Walter Mann, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 877 days.

(21) Appl. No.: 09/734,910

(22) Filed: Dec. 11, 2000

Related U.S. Application Data

(63) Continuation-in-part of application No. 09/436,136, filed on Nov. 9, 1999, now Pat. No. 6,721,780.

(51) Int. Cl.[7] .............................................. G06F 15/16
(52) U.S. Cl. ..................... 709/203; 709/217; 709/219; 709/246; 711/137; 711/213
(58) Field of Search ................................ 709/203, 223, 709/224, 226, 213, 217, 219; 711/137, 213

(56) References Cited

U.S. PATENT DOCUMENTS

| | | |
|---|---|---|
| 5,680,634 A | 10/1997 | Estes |
| 5,728,129 A | 3/1998 | Summers |
| 5,774,660 A | 6/1998 | Brendel et al. |
| 5,802,292 A | 9/1998 | Mogul |
| 5,826,258 A | 10/1998 | Gupta et al. |
| 5,845,088 A | 12/1998 | Lewis |
| 5,859,971 A | 1/1999 | Bittinger et al. |
| 5,878,223 A * | 3/1999 | Becker et al. ............... 709/223 |
| 5,878,429 A | 3/1999 | Morris et al. |
| 5,931,904 A | 8/1999 | Banga et al. |
| 5,944,790 A | 8/1999 | Levy |
| 5,978,841 A | 11/1999 | Berger |
| 5,983,227 A | 11/1999 | Nazem et al. |
| 5,987,480 A | 11/1999 | Donohue et al. |
| 6,003,087 A | 12/1999 | Housel, III et al. |
| 6,021,426 A | 2/2000 | Douglis et al. |
| 6,026,413 A | 2/2000 | Challenger et al. |
| 6,067,565 A | 5/2000 | Horvitz |

(Continued)

FOREIGN PATENT DOCUMENTS

WO     WO00/28433 A2     5/2000

(Continued)

OTHER PUBLICATIONS

Jeffrey Mogul et al. "HTTP Delta Clusters and Templates". Network Working Group, Internet Draft, Aug. 24, 2000.

(Continued)

*Primary Examiner*—Frantz B. Jean
(74) *Attorney, Agent, or Firm*—Shawn B. Dempster

(57) ABSTRACT

The invention provides a method for predicting which network objects are likely to be requested by a web user from a web server, such as that used in conjunction with an internetworking environment. A request made by a web user for a web object is parsed and dynamic values contained therein normalized. A prediction is made based on the normalized request, statistical measures, and other factors about what other web objects the web user is likely to request. The predictive information is then made available to the web server and the predicted net objects are pre-downloaded to the Web client. A pre-download statistics server may be used to record and provide statistics to assist in the prediction process. Examples described herein relate to web pages, but the invention is broadly applicable to many different types of requests for information (such as, for example, database queries and other libraries of information.)

19 Claims, 4 Drawing Sheets

U.S. PATENT DOCUMENTS

| | | | |
|---|---|---|---|
| 6,098,152 | A | 8/2000 | Mounes-Toussi |
| 6,112,242 | A | 8/2000 | Jois et al. |
| 6,138,251 | A | 10/2000 | Murphy et al. |
| 6,144,990 | A | 11/2000 | Brandt et al. |
| 6,154,767 | A | 11/2000 | Altschuler et al. |
| 6,216,212 | B1 | 4/2001 | Challenger et al. |
| 6,256,712 | B1 | 7/2001 | Challenger et al. |
| 6,260,192 | B1 | 7/2001 | Rosin et al. |
| 6,263,352 | B1 | 7/2001 | Cohen |
| 6,314,465 | B1 * | 11/2001 | Paul et al. .................. 709/226 |
| 6,327,628 | B1 | 12/2001 | Anuff et al. |
| 6,343,318 | B1 | 1/2002 | Hawkins et al. |
| 6,374,305 | B1 | 4/2002 | Gupta et al. |
| 6,377,978 | B1 | 4/2002 | Nguyen |
| 6,397,217 | B1 | 5/2002 | Melbin |
| 6,405,252 | B1 | 6/2002 | Gupta et al. |
| 6,466,937 | B1 | 10/2002 | Fascenda |
| 6,553,413 | B1 | 4/2003 | Leighton et al. |
| 6,560,604 | B1 | 5/2003 | Fascenda |
| 6,623,529 | B1 | 9/2003 | Lakritz |
| 6,629,138 | B1 * | 9/2003 | Lambert et al. ............ 709/224 |
| 6,697,844 | B1 | 2/2004 | Chan et al. |
| 6,704,024 | B2 | 3/2004 | Robotham |
| 6,721,780 | B1 | 4/2004 | Kasriel et al. |
| 6,728,785 | B1 | 4/2004 | Jungck |
| 6,760,746 | B1 | 7/2004 | Schneider |
| 2001/0037361 | A1 | 11/2001 | Croy |
| 2003/0009583 | A1 | 1/2003 | Douglis et al. |
| 2004/0128346 | A1 | 7/2004 | Melamed et al. |

FOREIGN PATENT DOCUMENTS

| | | | |
|---|---|---|---|
| WO | WO 00/28433 | A2 | 5/2000 |
| WO | WO00/28433 | A3 | 5/2000 |
| WO | WO 00/28433 | A3 | 5/2000 |

OTHER PUBLICATIONS

Alberto Accomazzi. "rproxy", rproxy/libhsync pages. Jan. 8, 2002.

Delphion Intellectual Property Network to search. "Wecome to the new world of IP Information, Delphion". 1997-2001 Delphion Inc.

Goulde, M., Network Caching Guide: Optimizing Web Content Delivery, Boston, MA, Patricia Seybold Group, Mar., 1999, pp. i-42.

Marshall Brian, How Suff Works, "How Web Servers and the Internet Work," obtained at Internet address http://www.howstuffworks.com/web-server.htm.

* cited by examiner

PREDICTIVE PRE-DOWNLOAD USING NORMALIZED NETWORK OBJECT IDENTIFIERS

CROSS-REFERENCE TO RELATED APPLICATION

This application is a continuation-in-part of application Ser. No. 09/436,136, filed Nov. 9, 1999, entitled "Predictive Pre-Download of Network Objects," and issued as U.S. Pat. No. 6,721,780 on Apr. 13, 2004; and hereby incorporated by reference.

BACKGROUND OF THE INVENTION

1. Field of the Invention

This invention relates to pre-download of network objects from a server and incorporates a process for normalizing a network object identifier in a request message.

2. Related Art

In computer networks, client devices often request and receive information from server devices. A common example of such client-server information occurs during use of the World Wide Web, in which a web client (sometimes called a web "browser") requests web pages and embedded network objects from a web server (sometimes called a "web site").

One problem in the known art is that web clients experience some delay between the time they request a web page from a web server and the time that that web page is presented by the web client software to the user. This delay can be due to the size of the web page, the limited connection bandwidth, the network distance to the web server, the load on the web server, or other factors.

A method exists that provides a technique for pre-download of network objects from a server, such as is used in conjunction with an internetworking environment, which reduces the time users wait for delivery and presentation of those network objects. A device which is coupled to the web-server maintains statistical information regarding which network objects are most likely to be requested by users and gives hints to a client-side component to pre-download those network objects to associated web clients in advance of actual requests being made by the user for those network objects. This is achieved by analyzing the request messages sent by the user to predict which subsequent network objects are likely to be requested by that user.

This method is less effective when the network object identifier, such as a URL (Uniform Resource Locator), contains a search string, a variable, or some other dynamic value. In such cases, two problems are likely to occur: (1) the number of possible URL's becomes arbitrarily large and unmanageable because each page has an infinite number of URL's that refer to it; and (2) the predictive value is decreased because the URL is specific to a single user, such as when the value is a user identifier, and there are too few links between similar URL's. The invention provides a method for increasing the effectiveness of the pre-download method and system.

SUMMARY OF THE INVENTION

The invention provides a method and system for pre-downloading network objects from a server when requests for those network objects contain dynamically changeable identifiers with variable data included. In a web server, there is a device which maintains information regarding which network objects are most likely to be requested by users, and which pre-downloads those network objects to associated web clients in advance of user prompted requests. The invention provides a method and system for (1) normalizing requests containing variables; (2) retrieving a normalized prediction; (3) de-normalizing the prediction; and (4) pre-downloading a network object in response to the de-normalized prediction. The invention incorporates a pre-download statistic server to assist in adjusting the prediction process. With this process, the invention is better able to predict which network objects will be requested by the user and reduce the time the user waits for delivery of those network objects.

DETAILED DESCRIPTION OF THE PREFERRED EMBODIMENT

Figure 1:
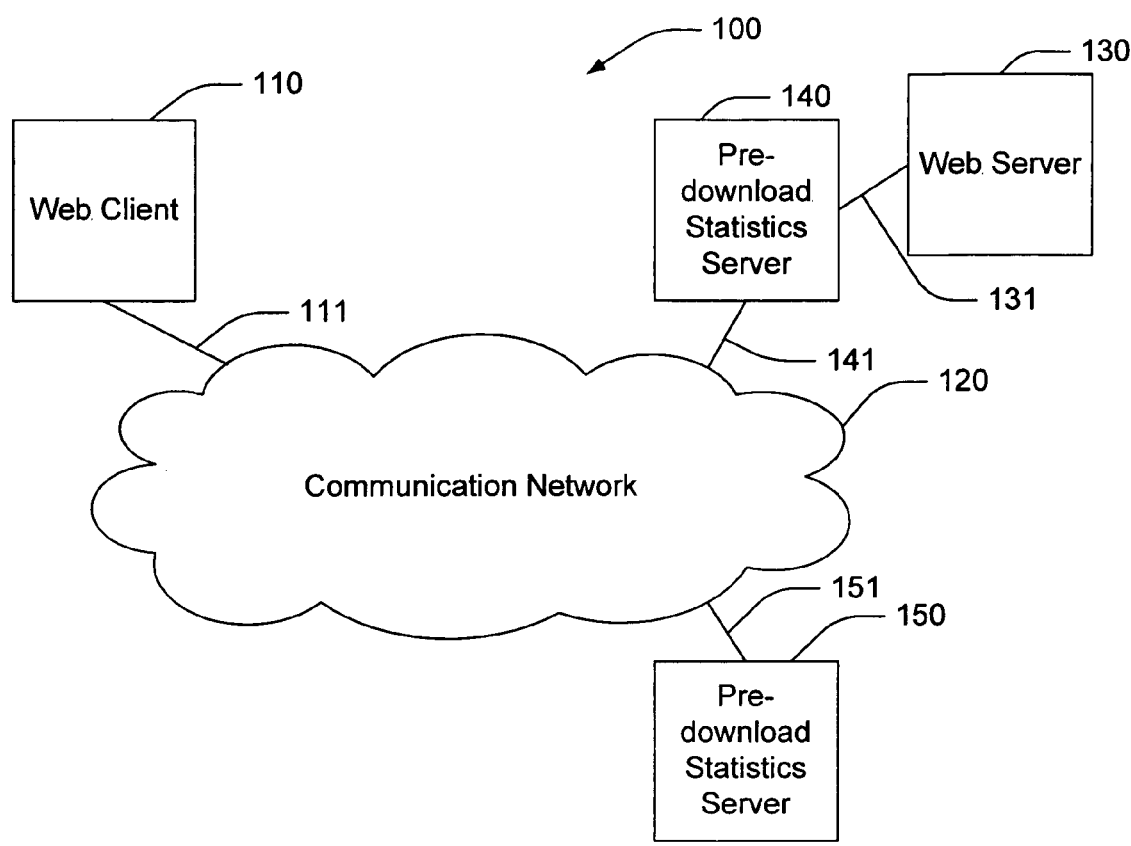
FIG. 1 shows a block diagram of a system for pre-downloading network objects from a Web server 130.

In the following description, preferred and alternative embodiments of the invention are described with regard to process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

Network objects—In general, web pages and data elements embedded therein.

Web server—In general, a server for providing web pages and data elements therein to requesting clients.

Pre-download—In general, requesting web pages and data elements, by a web client from a web server, before a user at that web client specifically requests them.

Actual request—In general, an action taken by a user to specifically request any network object.

Delivery—In general, sending a web page from a web server to a web client.

Statistical information—In general, information regarding which network objects and links between network objects appear on a web page and which network objects are relatively more or less likely to be selected by a user viewing that web page.

Pre-download hint (Hint)—In general, information provided by a web server to web clients prompting the Web client to request pre-download of network objects before a user prompted request for those predicted network objects is made.

Pre-download rules—In general, information at a web server regarding which network objects are relatively more or less desirable for the user to receive without delivery latency.

Pre-download Applet—In general, a program that may be distributed as an attachment and transferred using a communications network, which causes at least some of the predictive elements of the system to be downloaded at the Web client.

Demographic information—In general, information about the user at a web client (such as their locale, time zone, or primary language.)

Past behavior—In general, information about a user responsive to whether that user is a frequent user of the web site, frequent purchaser of goods or services at that web site, or other relevant past behavior.

Web Client and Server—These terms refer to a relationship between two devices, particularly to their relationship as Web client and server, not necessarily to any particular physical devices.

For example, but without limitation, a particular Web client device in a first relationship with a first server device can serve as a server device in a second relationship with a second Web client device.

Client device and Server device—These terms refer to devices taking on the role of a Web client or a server in a Web client-server relationship (such as an HTTP Web client and web server.) There is no particular requirement that any Web client devices or server devices must be individual physical devices. They can each be a single device, a set of cooperating devices, a portion of a device, or some combination thereof.

Referrer URL—In general, the URL from which a request for download of a network object is made.

Target URL—in general, that portion of a Universal Resource Locator that refers to the location of the network object requested from the Web server.

Requestor Bit—In general, the binary digit contained in a request for a network object; such request usually originating from a user prompt at the Web client or from the Web client in response to direction by a pre-download device.

Requestor Bit Log—In general, a database recording whether requests for pre-download of network objects came from the user or the predictive download device.

Dynamic names—In general, a portion of a URL string that identifies the Web client or user and which is associated with a variable value. The string may contain state information of any kind and is dynamic if its value is not relevant for prediction purposes (i.e. if you can make better predictions by working on the quotient set rather than the set itself.)

Non-dynamic names—In general, a portion of a URL string that identifies a Web client and does not contain variable values.

Log File—In general, a file containing a list of the URL identifiers for Web clients.

Normalize—In general, the process of changing variable values to placeholder values.

Predict—In general, the process of determining which network objects are most likely to be requested by a user at the Web client.

As noted above, these descriptions of general meanings of these terms are not intended to be limiting, only illustrative. Other and further applications of the invention, including extensions of these terms and concepts, would be clear to those of ordinary skill in the art upon review of this application. These other and further applications are part of the scope and spirit of the invention, and would be clear to those of ordinary skill in the art, without further invention or undue experimentation.

System Elements

FIG. 1 shows a block diagram of a system for pre-downloading network objects from a server.

A system 100 includes a set of Web clients 110, a communication network 120, a Web server 130, a pre-download device 140, and a pre-download statistics server 150.

Each Web client 110 includes a processor, program and data memory, mass storage, and a client communication link 111. The processor, program and data memory and mass storage operate in conjunction to perform the functions of a Web client 110 (also known as a Web "browser"). The processor, program and data memory and mass storage may also function as a local Web client cache 160. In an alternative embodiment, the Web client 110 includes an applet 170 supplied by the Web server 130. The Web client 110, using the HTTP ("hypertext transfer protocol") requests network objects from the Web server 130 and, using HTTP responses, receives those network objects from the Web server 130. Although, in a preferred embodiment, the Web client 110 uses the HTTP protocol or variant thereof, there is no particular requirement for use of that specific protocol or its variants. The requests and responses are routed using the communication network 120 and are received and processed by the Web server 130.

The client communication link 111 operates to couple a Web client 110 to the communication network 120.

In a preferred embodiment, the communication network 120 includes an Internet, intranet, extranet, virtual private network, enterprise network, or another form of communication network. In a preferred embodiment, the communication network 120 includes a network capable of routing messages between and among one or more Web clients 110 and Web servers 130. However, there is no particular requirement that the communication network 120 must comprise an actual network, so long as the communication network 120 includes at least some technique for communication between the Web client 110 and Web servers 130.

The Web server 130 includes a processor, program and data memory, mass storage, and a server communication link 131. The processor, program and data memory, and mass storage operate in conjunction to perform the functions of a Web server 130 (also known as a web "site"). The Web server 130 responds to the Web client 110 using the HTTP protocol. Although, in a preferred embodiment, the Web server 130 uses the HTTP protocol or variant thereof, there is no particular requirement for use of that specific protocol or its variants.

The pre-download statistics server 150 includes a processor, program and data memory, mass storage, and a statistics server communication link 151. The pre-download statistics server 150 operates in a similar manner to a Web server 130, with a difference that the pre-download statistics server 150 receives and maintains pre-download statistics for the Web server 130. Interested parties can later examine those pre-download statistics; these could include a user at the Web client 110, an operator or web site administrator at the Web server 130, or a user (or program) at another device coupled to the communication network 120.

A prediction is made at the pre-download device 140 or at the Web client 110 to determine what web object the Web client 110 is likely to request from the Web server 130 based on the initial request.

Preferred Embodiment: Prediction Occurs at the Pre-Download Device

In the preferred embodiment, the pre-download device 140 intercepts requests for network objects from the Web client 110 as well as responses to the request from the Web server 130. The pre-download device 140 determines which network objects are most likely to be requested by the Web client 110 from the Web server 130. The pre-download device 140 then directs the Web client 110 to request those network objects from the Web server 130 prior to their actual request from a user at the Web client 110. Downloading of the requested network object begins immediately after the pre-download request is received by the server. Thus, the Web client 110 will have those network objects available in its local Web client cache 160 prior to any user prompted request for the same. If and when a user makes a request for the predicted and pre-downloaded network objects, the Web client 110 will be able to present those network objects to the user with relatively little latency.

Figure 2:
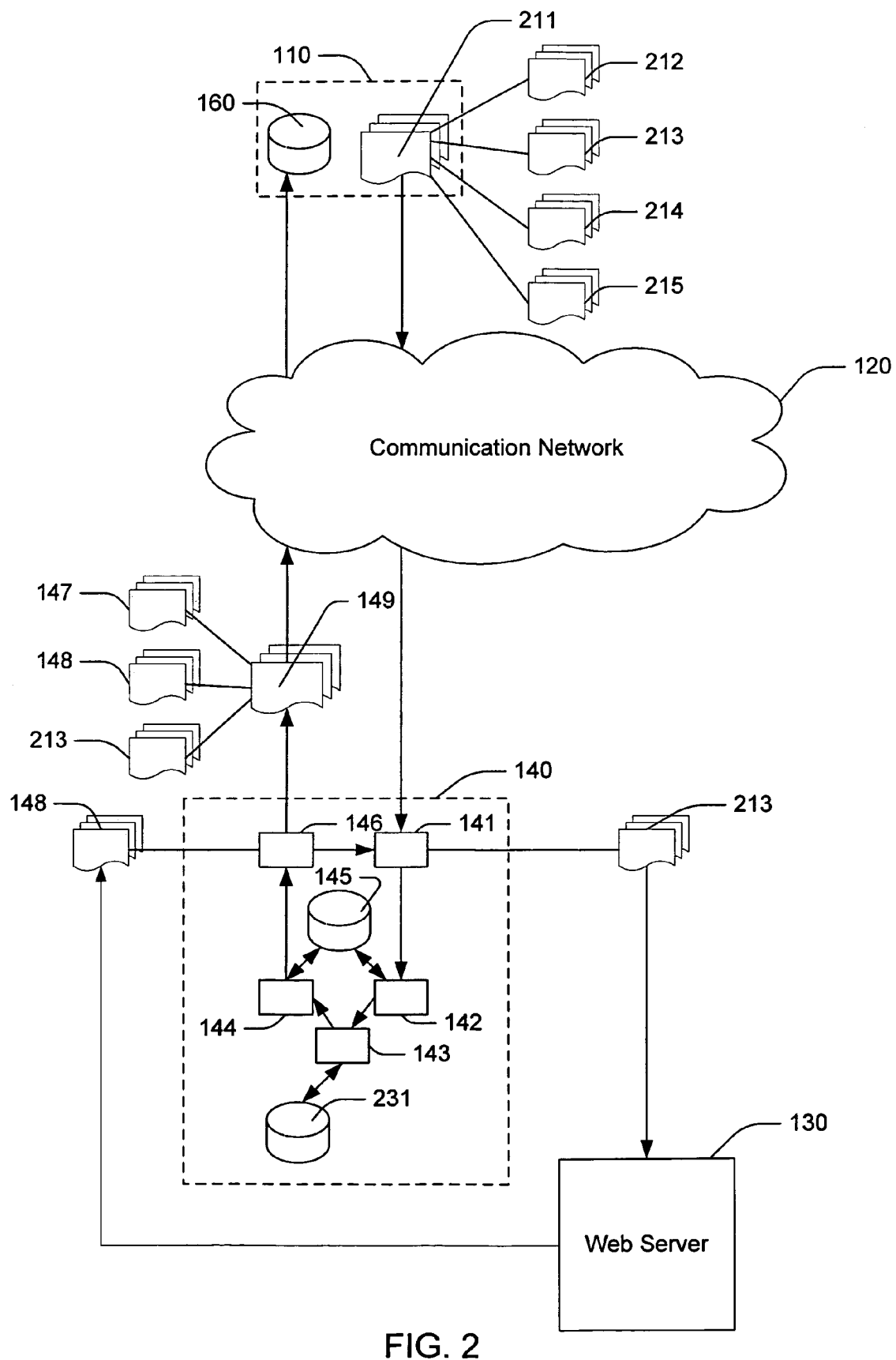
FIG. 2 shows a block diagram of a preferred embodiment of a system for pre-downloading network objects from a server using a pre-download device coupled with a Web server 130

FIG. 2 shows a block diagram of a preferred embodiment of a system for pre-downloading network objects from a server using a pre-download device 140 coupled with a Web server 130.

Each message 211 includes a first URL 212 (referred to herein as a "referrer URL") indicating a referring network object, and a second URL 213 (referred to herein as a "target URL") indicating a requested network object. Each message 211 also includes a requester-bit 214, indicating whether the request for the network object comes from a user prompted request made at the Web client 110, or from the Web client 110 in response to a hint provided by the pre-download device 140. Each message 211 also includes additional relevant information 215 such as a time stamp, a source IP address and port, and a destination IP address and port.

The pre-download device includes a URL identification element 141, a normalization element 142, a prediction element 143, a denormalization element 144, a variable database 145, a hint attachment element, and a Web site graph 231. The Web site graph 231 may be stored either locally or externally.

The combination of the URL identification element 141, the normalization element 142, the prediction element 143, a denormalization element 144, the variable database 145, the hint attachment element 146, and the Web site graph 231, also may be referred to as a request processing element.

The pre-download device 140 intercepts a message 211 (i.e. and request for a network object) from a Web client 110 to the Web server 130 and the response 148 (i.e. the network object) sent from the Web server 130 to the Web client 110.

Upon receipt of the message by the pre-download device, the URL identification element 141 parses the message 211 and identifies the referrer URL 212, the target URL 213, the requester bit 214, and any additional relevant information 215 contained in the message 211 about the user or the Web client 110, such as a time stamp, the source IP address and port, and the destination IP address and port.

The normalization element 142 then accesses the variable database 145 and determines which values contained in the target URLs are dynamic (i.e. are variables). The normalization element 142 removes the bindings from the dynamic target URLs and replaces them with placeholder values.

The prediction element 143 accesses the Web site graph 231 and predicts which network objects the Web client 110 is likely to request from the Web server 130. The prediction, otherwise known as a "hint," is in a similar form as the normalized target URL and may contain placeholder values.

The denormalization element 144 then accesses the variable database 145 and substitutes in the hint URL the bindings previously removed from the target URL. The hint 147 is then sent to the Web client 110.

The hint attachment element 146 attaches the hint 147 to the requested network object 148 received from the Web server 130. As a result, the hint response and the network object 148 are sent together 149 through the communication network 120 to the Web client 120.

The Web client 110 receives the hint 147 and responds by pre-downloading the network object that corresponds to the hint 147. Thus, the Web client 110 pre-downloads the predicted network object prior to Web client 110 making a user prompted request for that network object. Thus, the latency period between an actual request for a network object and the download of the network object is decreased.

Alternative Embodiment: Prediction Occurs at the Web Client

Figure 3:
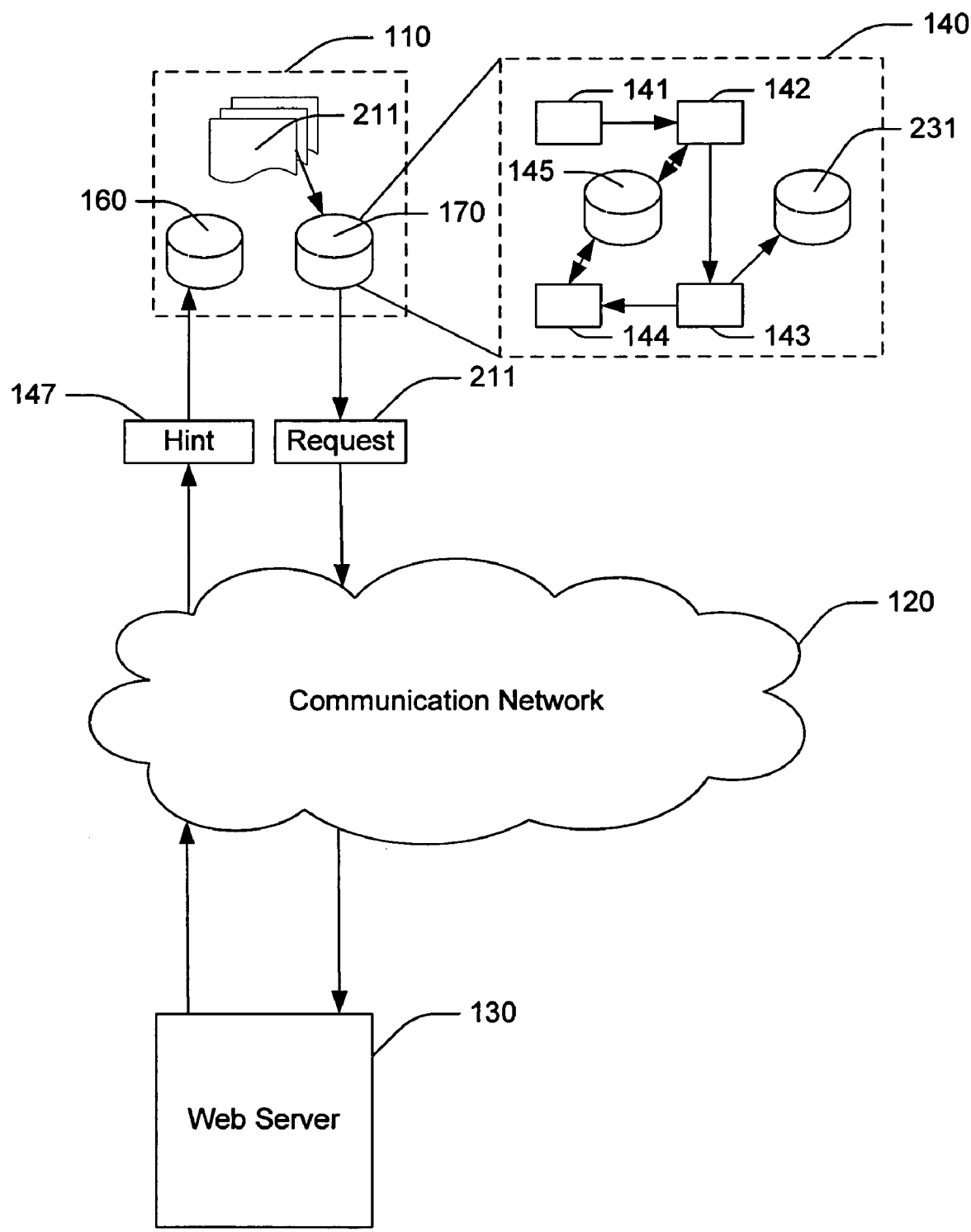
FIG. 3 shows a block diagram of an alternative embodiment of a system for pre-downloading network objects from a Web server using an applet 170 stored on a Web client 110.

FIG. 3 shows a block diagram of an alternative embodiment of a system for pre-downloading network objects from a server using an applet 170 stored on a Web client 110.

In an alternative embodiment, at least part of the prediction process occurs at the Web client 110 and not at the pre-download device 140. The Web client 110 contains an applet 170 including a URL identification element 141, a normalization element 142, a prediction element 143, a denormalization element 144, a variable database 145, and a Web site graph 231, similar to those elements shown in FIG. 2. In this alternative embodiment, inclusion of a hint attachment element 146 depends on whether the applet is written such that the functionality of the predownload process occurs in the same process as the Web client 110 (in which case it would not be needed) or whether the predownload process runs separate from the process of the Web client 110 (in which case it may be included to attach the hint 147). As in the preferred embodiment, the Web site graph 231 may also be stored either locally or externally.

The combination of the URL identification element 141, the normalization element 142, the prediction element 143, the denormalization element 144, the variable database 145, and the Web site graph 231, also may be referred to as a request processing element.

The Web client 110 sends a user prompted request (i.e. a message 211) to the Web server 130 requesting a specified network object.

As in the preferred embodiment of the system, each message 211 includes a first URL 212 (the "referrer URL") indicating a referring network object, and a second URL 213 (the "target URL") indicating a network object. Each message 211 also includes additional relevant information 215, such as a time stamp, a source IP address and port, and a destination IP address and port. Each message 211 also includes a requester-bit 214, indicating whether the request for the target network object comes from a user prompted request made at the Web client 110, or from the Web client 110 in response to direction by the applet 170.

The URL identification element 141 parses the request and identifies the referrer URL 212, the target URL 213, the requester bit 214, and any additional relevant information 215 such as a time stamp, the source IP address and port, and the destination IP address and port.

The normalization element 142 then accesses the variable database 145 and determines which values contained in the referrer URL's are dynamic (i.e. are variables). The normalization element 142 removes the bindings from the dynamic referrer URLs and replaces them with placeholder values.

The prediction element 143 accesses the Web site graph 231 and predicts which network objects the Web client 110 is likely to request from the Web server 130. The prediction 147, otherwise known as a "hint," is in a similar form as the normalized target URL and may contain placeholder values. Although the prediction 147 may be based on the likelihood that a user will request a certain network object, the prediction may be based on other factors as discussed in other parts of this application.

The denormalization element 144 then accesses the variable database 145 and replaces the bindings and dynamic values previously removed from the referrer URLs by the normalization element 142. The hint 147 is then sent to the Web client 110.

The Web client 110 receives the hint 147 and responds by pre-downloading the predicted network object before the Web client 110 makes a user prompted request for that network object. If and when a user prompted request is made at the Web client 110 for the predicted and pre-downloaded network object, that target object will already have been requested. Thus, the latency period between the time the user makes a request at the Web client 110 for a predicted network object and the download of that network object is decreased.

Maintenance of Statistical Information Using a Web-site Graph

Figure 4:
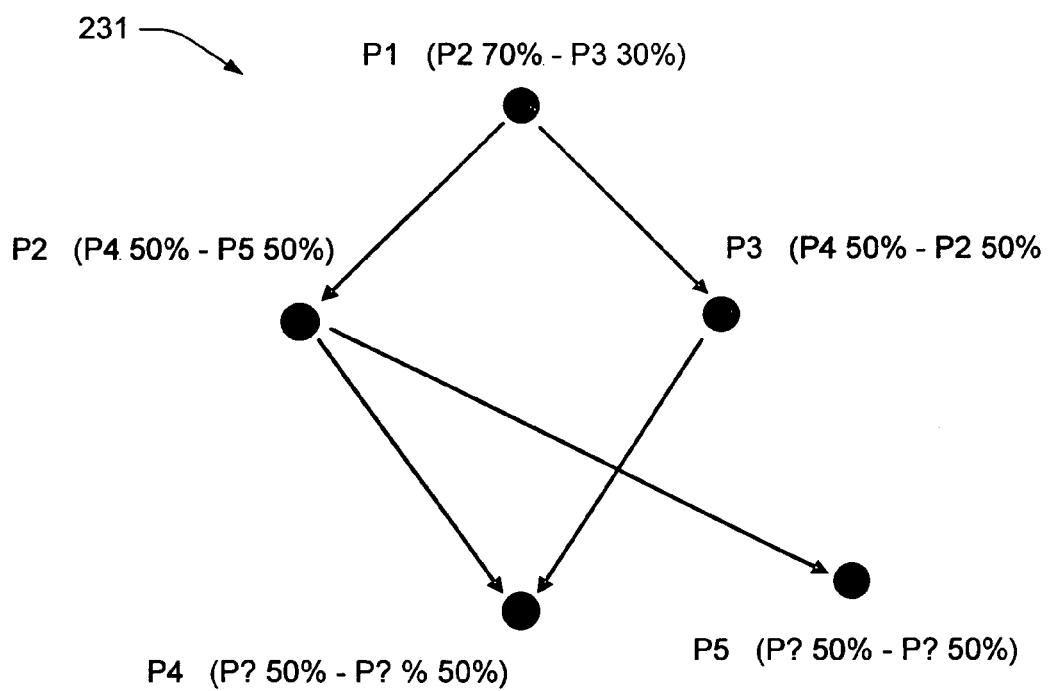
FIG. 4 shows a Web site graph 231.

FIG. 4 shows an example of a Web-site graph 231.

The nodes shown on FIG. 4 represent network objects that exist on a web site (i.e. a web destination hosted by a web server 130.) For example, node P1 may represent a single network object (e.g. the text on a first page of a web hosted document.) Predictive statistics associated with node P1 may correlate with a likelihood that a user will make a request at the Web client 110 for other network objects (or pages) located at the server hosted web site. In FIG. 4, for example, network object P1 is associated with network objects P2 and P3.

In addition to associations between network objects, the Web site graph 231 may reflect predictive statistics or weighted values that may control the order in which associated network objects are pre-downloaded to the Web client 110. FIG. 4, the predictive statistics or weighted values associated with network objects P2 and P3 are 70% and 30% respectively. These statistics or values may reflect such factors as the likelihood that P2 or P3 will be requested by the user immediately subsequent to users request for P1. Considering these predictive statistics, the pre-download device may cause P2 to be pre-downloaded before P3. Alternatively, pre-download priority may be set by weighted values assigned by an operator or web site administrator.

Predictive statistics may reflect probabilities, as stated above, based on actual results made by a single user or any number of users over time. A statistics server 150 may be employed to keep a tally of all requests made by a single web server or a number of web servers and adjust associations between network objects as well as statistics or values affecting pre-download order.

Predictive statistics or weighted values may be based on the content and architecture of the web site. For example, P1 represent a first page of text of a web hosted document and P2 represent the second page text. The pre-download statistics server or a web administrator may assign a value of 70% to P2 because there is a 70% chance that users who view the first page will make a subsequent request for the second page. If, for example, network object P3 represents the table of contents of the web site, the assigned value of 30% may reflect a 30% chance that users who view the first page will not be interested in viewing the second page and will subsequently request the table of contents. While the values associated with each network object may reflect statistics automatically calculated by a statistics server, they may also be assigned manually.

The values associated with each network object on the graph may reflect other factors such as the size of the network object. For example, the pre-download statistics server or administrator may assign values to network objects based on the time it takes a user to review an associated network object relative to the time is takes to pre-download an associated network object. For example, if P1 is the title page of a web based document, one can expect that a user will take relatively little time to review it and request another page. If there will not be enough time to pre-download all associated file prior to the user making a subsequent request, the order in which associated network objects P2 and P3 are pre-downloaded may then depend on how long it takes each to be pre-downloaded (i.e. how large the files are.) For example, it may be preferable to pre-download the smaller file first so that user will better realize the benefit of the pre-download process. Alternatively, it may be preferable to pre-download larger files first because the time to download a smaller network object may be negligible. The pre-download device and pre-download statistics server may adjustable to incorporate any number of preferences.

The Web site graph 231 not only reflects predictive statistics or weighted values regarding such network objects as web-pages, but to network objects that are actually embedded elements within those web-pages. Thus, if a web-page contains embedded elements, these elements will be requested by the Web client 110 at the same time as their parent web-page. In terms of the example provided in FIG. 4, if P2 denotes a network object that is a web page and that web page contains embedded element E1, then the likelihood that E1 will be requested is the same as the likelihood P2 will be requested, or 70%. Additionally, since elements may be shared by different web pages, they may be statistically more likely to be requested. For example, if both P2 and P3 have embedded element E1, then E1 will be requested 100% of the time (according to FIG. 4), and is, thus, statistically more likely to be requested that either P1 or P2.

Alternatively, the predictive statistics or weighted values associated with network object on the web site graph 231 may reflect the objectives of the web site or the preferences of a web site administrator. For example, the pre-download device and pre-download statistics server may be programmed to pre-download certain network objects regardless of user preferences or other factors. Where the objective of the site is to produce income through online purchase, for example, the administrator may want to make sure that the user does not have to wait for download of the network objects associated with making a purchase (such as the check-out page.) The web site administrator may adjust the web site graph so that when a Web client 110 requests a network object showing pricing for certain product available for purchase, that the network object showing check out information is pre-downloaded immediately.

The web site graph may be modified automatically using pre-download statistics server 150 or modified manually by an operator or the web site administrator. The pre-download statistics server 150 may determine network object association and calculate probabilities based on averages calculated for all users accessing the site, averages based on any single users or group of users activity, or preferences based on demographic factors such as geographical location, age, or income. The web site graph may be modified according information provided by users in response to online questionnaires. Probabilities and/or profiles pertaining to particular users or user groups may be stored in the pre-download statistics server 150 database and accessed each time a user accesses the subject web site.

The embodiments described above are not mutually necessarily exclusive and may be used in combination.

Preferred Embodiment: Prediction Incorporating Use of a Requestor Bit Log

In a preferred embodiment, the invention incorporates a Requestor Bit Log which keeps track of whether requests for pre-download of network objects were made by the user or by the predictive pre-download device. The four possible states associated with each request for pre-download are: 1) a request made by the user which was not previously pre-downloaded; 2) a request made by the user which was previously pre-downloaded and recorded in the Requestor Bit Log, 3) a request made by the predictive pre-download device which was not previously recorded in the Requestor Bit Log, and 4) a request made by the predictive pre-download device which was previously recorded in the Requestor Bit Log. A request is not recorded in the Requestor Bit Log if the requested network object had already been pre-downloaded (i.e. when the prediction was successful) or when the user downloads a network object that the predictive pre-download device did not predict the user would request (which is the case, for example, when the user hits the "back" button to revisit a target object that that user has already reviewed and the predictive pre-download devise could not predict the user would be reviewing.)

The purpose of the Requestor Bit Log is to insure that the statistics which may be attached to each associated network object on the web site graph 231 reflect requests and preferences from the user and not requests for pre-download from the pre-download device 140. By distinguishing user prompted requests from pre-download requests prompted by the pre-download device, the system may prevent improper associations between network objects or skewed statistics based on requests prompted by the pre-downloaded device which were not subsequently made by the user.

The Requestor Bit Log may exist as part of the part of the pre-download statistics server, the pre-download device, the pre-download applet, or some other device or program connected to the system through the communications network.

Preferred Method of Prediction and Pre-Download

Figure 5:
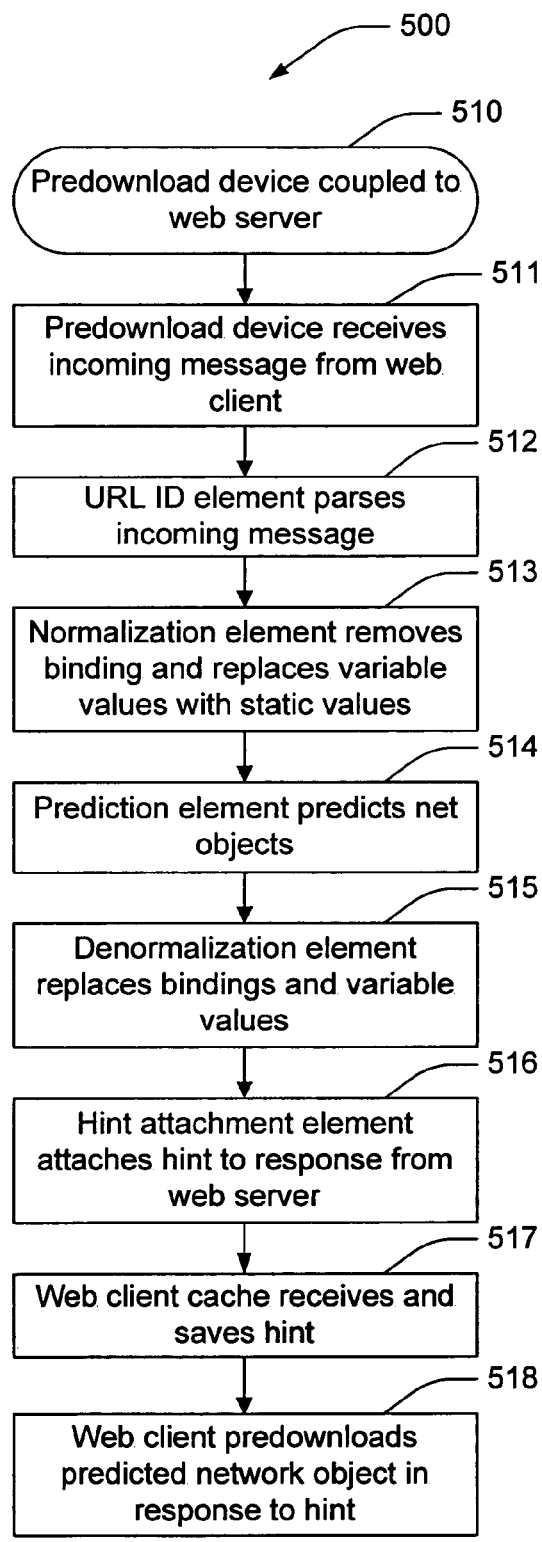
FIG. 5 shows a process flow diagram of a preferred method for predicting and pre-downloading network objects from a server.

FIG. 5 shows a process flow diagram of a preferred method for predicting and pre-downloading network objects from a server.

Method 500 is performed by the system 100. The method is described and performed serially.

At a flow point 510, the pre-download device 140 is coupled to the Web server 130, and is ready to receive incoming requests from one or more Web clients. The pre-download device 140 includes a URL identifying element 141, a normalization element 142, a prediction element 143, a denormalization element 144, a variable database 145, and a hint attachment element 146.

At a step 511, the pre-download device 140 receives an incoming message 211 from a Web client 110 asking for a network object from the Web server 130.

At a step 512, the URL identification element 141 parses the message 211 and identifies the referrer URL, the target URL, and any other relevant information contained in the request about the user or the Web client 110, such as the source IP address and port.

At a step 513, the normalization element 142 uses the variable database to identify and remove the bindings from the dynamic referrer URLs and replace the variable values with static values.

At a step 514, the prediction element 143 accesses the Web site model graph and predicts which network object pages the Web client 110 is likely to request from the Web server 130. The prediction is known as a "hint".

At a step 515, the denormalization element 144 accesses the variable database 145 and replaces the placeholder values in the hint URL with the dynamic values that were removed from the target URL by the normalization element 142.

At a step 516, the hint attachment element 146 attaches the hint to the requested network object and both are sent to the Web client 110.

At a step 517, the Web client 110 receives the hint and requested network object.

At step 518, the Web client 110 responds to the hint by requesting pre-downloads the predicted network object.

Alternative Method of Prediction and Pre-Download

Figure 6:
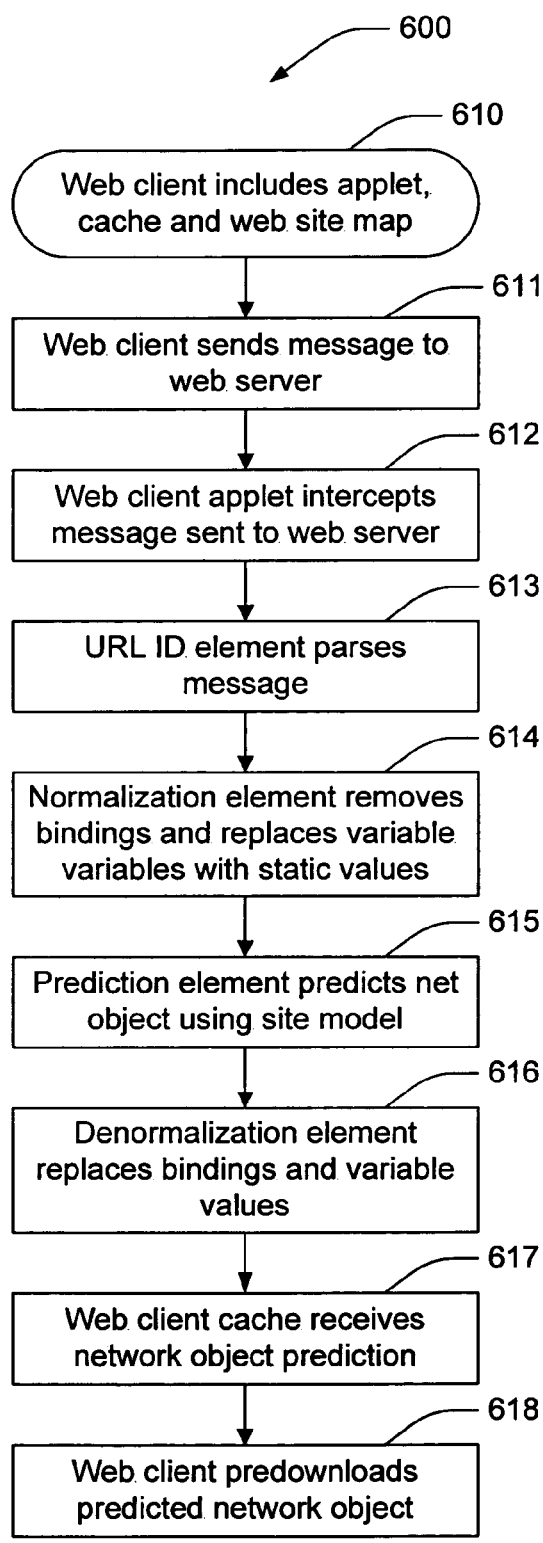
FIG. 6 shows a block diagram of an alternative method for predicting and pre-downloading network objects from a web server.

FIG. 6 shows a block diagram of an alternative method for predicting and pre-downloading network objects from a web server.

A method 600 is performed by the system 100. The method is described and performed serially.

At flow point 610, a Web client 110 includes an applet 170 and local Web client cache 160.

At a step 611, the Web client sends a message 211 to the Web server 130 asking for a network object.

At a step 612, the applet 170 intercepts the message 211 sent to the Web server 130 asking for a network object.

At a step 613, the URL identification element 141 parses the message 211 and identifies the referrer URL, the target URL, and any other relevant information contained in the request about the user or the Web client 110, such as the source IP address and port.

At a step 614, the normalization element 142 removes the bindings from the dynamic referrer URLs and replaces variable values with static values pertaining to certain network objects stored on the Web server 130.

At a step 615, the prediction element 143 uses the Web site graph 231 to predict which network object pages the Web client 110 will request from the Web server 130. The prediction is otherwise known as a "hint").

At a step 616, the denormalization element 144 replaces the bindings and the dynamic values in the referrer URLs.

At a step 617, the local Web client cache 160 receives and saves the hint.

At step 618, the Web client 110 pre-downloads a request for a network object in response to the hint.

Generality of the Invention

The invention has general applicability to various fields of use, not necessarily to the services described above. For example, these fields of use can include one or more of, or some combination of, the following:

Queries to database servers, in which queries are correlated with regard to database records when relatively close in time.

Requests for information from information libraries, in which queries are correlated with regard to library documents when relatively close in time.

Other types of requests for information from server devices.

Other and further applications of the invention in its most general form, would be clear to those skilled in the art after review of this application, and are within the scope and spirit of the invention.

Alternative Embodiments

Although preferred embodiments are disclosed herein, many variations are possible which remain within the concept, scope, and spirit of the invention, and these variations would become clear to those skilled in the art after review of this application.

What is claimed is:

1. A method for enabling pre-downloads of network objects by a web client, comprising steps of:
   receiving a request including a variable for a network object;
   normalizing the request by removing the variable and replacing the variable with a placeholder value;
   determining a prediction of a future network object likely to be requested by the web client in the form of a hint; and
   de-normalizing the hint by substituting in the variable removed from the request into a URL for the hint.

2. The method of claim 1 further comprising a step of attaching the hint URL to the requested network object to form a response.

3. The method of claim 2 further comprising a step of sending the response over a communication network to the web client.

4. The method of claim 1 wherein the determining step comprises accessing a Web-site graph including at least one normalized request.

5. The method of claim 4 further comprising a step of updating the Web-site graph with predictive statistics regarding network objects.

6. The method of claim 1 further comprising a step of serving the hint URL to the client associated with the request.

7. The method of claim 1, wherein the network object comprises one of: an embedded object associated with a web page and a web page.

8. A system for enabling pre-downloads of network objects by a web client, comprising:
   a URL identification element that receives a request including a variable for a network object;
   a normalization element configured to normalize the request by removing the variable and replacing the variable with a placeholder value;
   a prediction element configured to determine a prediction of a future network object likely to be requested by the web client in the form of a hint; and
   a de-normalization element configured to de-normalize the hint by substituting in the variable removed from the request into a URL for the hint.

9. The system of claim 8 further comprising a hint attachment element configured to attach the hint URL to the requested network object to form a response.

10. The system of claim 9 wherein the hint attachment element is configured to send the response over a communication network to the web client.

11. The system of claim 8 wherein the prediction element is configured to access a Web-site graph including at least one normalized request.

12. The system of claim 11 further comprising a predictive statistics server configured to update the Web-site graph with predictive statistics regarding network objects.

13. The system of claim 8 further comprising a web server configured to serve the hint URL to the client associated with the request.

14. The system of claim 8, wherein the network object comprises one of: an embedded object associated with a web page and a web page.

15. A memory storing information including instructions interpretable by a processor for application to a request for a network object to enable pre-downloads of network objects, the request including a variable, the instructions comprising:
   normalizing the request by removing the variable and replacing the variable with a placeholder value;
   determining a prediction of a future network object likely to be requested in the form of a hint; and
   de-normalizing the hint by substituting in the variable removed from the request into a URL for the hint.

16. The memory of claim 15 wherein the instructions further comprise attaching the hint URL to the requested network object to form a response.

17. The memory of claim 15 further storing information including a web-site graph interpretable by a processor for application to a request for the network object, the Web-site graph comprising a directed graph of nodes, each node referring to a network object.

18. The memory of claim 17 wherein the Web-site graph includes a predictive statistic associated with at least one node that has predictive value regarding future network objects to be requested.

19. The memory of claim 15 wherein the instructions further comprise serving the hint URL to a web client associated with the request.

* * * * *